United States Patent
Strong et al.

(10) Patent No.: US 10,425,494 B2
(45) Date of Patent: Sep. 24, 2019

(54) FILE SIZE GENERATION APPLICATION WITH FILE STORAGE INTEGRATION

(71) Applicant: SmugMug, Inc., Mountain View, CA (US)

(72) Inventors: Brian Strong, San Jose, CA (US); Don Macaskill, Los Altos, CA (US)

(73) Assignee: SMUGMUG, INC., Mountain View, CA (US)

(*) Notice: Subject to any disclaimer, the term of this patent is extended or adjusted under 35 U.S.C. 154(b) by 210 days.

(21) Appl. No.: 14/964,320

(22) Filed: Dec. 9, 2015

(65) Prior Publication Data

US 2016/0179761 A1    Jun. 23, 2016

Related U.S. Application Data

(60) Provisional application No. 62/094,809, filed on Dec. 19, 2014.

(51) Int. Cl.
*G06F 17/00* (2019.01)
*H04L 29/08* (2006.01)

(52) U.S. Cl.
CPC .................. *H04L 67/28* (2013.01)

(58) Field of Classification Search
None
See application file for complete search history.

(56) References Cited

U.S. PATENT DOCUMENTS

| | | | |
|---|---|---|---|
| 5,911,776 A * | 6/1999 | Guck | G06F 17/30569 707/999.104 |
| 2004/0098363 A1 | 5/2004 | Anglin et al. | |
| 2005/0262246 A1* | 11/2005 | Menon | H04N 21/23103 709/226 |
| 2007/0208737 A1 | 9/2007 | Li et al. | |
| 2008/0071910 A1 | 3/2008 | Thukral | |
| 2009/0210528 A1* | 8/2009 | Swildens | H04L 12/14 709/224 |
| 2011/0078054 A1* | 3/2011 | Saito | G06Q 30/00 705/27.1 |
| 2013/0201349 A1* | 8/2013 | Balle-Pedersen | H04N 5/77 348/207.1 |
| 2014/0067898 A1 | 3/2014 | Steiner et al. | |
| 2014/0143298 A1* | 5/2014 | Klotzer | H04L 67/2823 709/203 |
| 2014/0344331 A1 | 11/2014 | Johns et al. | |
| 2015/0100667 A1 | 4/2015 | Freyria et al. | |
| 2017/0366644 A1* | 12/2017 | Grue | G06F 16/5866 |

* cited by examiner

*Primary Examiner* — Mustafa A Amin
(74) *Attorney, Agent, or Firm* — Patterson + Sheridan, LLP (57) ABSTRACT

Media file storage integration and the generation of device specific file formats based upon a single original stored media item are described. One or more remote servers may provide a user one or more remote storage locations for media files and the remote servers may determine an exact storage location for a media file based on certain usage criteria. A server may make a request to retrieve a media file from storage, generate the media file from storage, and display the media file to the user on a device specific graphical user interface without a requirement that the server re-store the device specific displayed media item.

21 Claims, 7 Drawing Sheets

FILE SIZE GENERATION APPLICATION WITH FILE STORAGE INTEGRATION

CROSS-REFERENCE TO RELATED APPLICATIONS

This application claims benefit to U.S. Provisional Patent Application No. 62/094,809, filed Dec. 19, 2014, the entirety of which is herein incorporated by reference.

BACKGROUND

Field

Embodiments described herein generally relate to file storage and the generation of device graphical user interface specific file formats. More specifically, embodiments provided herein relate to media file storage location selection and the device graphical user interface specific display and recall of the media file from storage.

Description of the Related Art

The production and availability of information and media has gained prevalence in today's society. The ability to instantly access and share information, experiences, news, photos, and videos over the internet has revolutionized the way people connect, learn, consume information, and participate in society today.

The storage and accessing of files and media items often takes place in the cloud via a device connected to the internet. Remote servers, which make up the cloud, maintain and store files and media items, but widely vary in storage size, price, and speed with which the files and media items are accessed. Files and media items which are accessed less often can be stored in cloud servers with slower access response speeds and times than files and media items which need to be readily available and accessible at any time. Often, if a file or media item has not been recently accessed or viewed, lacks unique users, or lacks updates to the file or media item itself, the file or media item does not require storage that is immediately available. However, files and media items which have recently been accessed, have high traffic from multiple unique users, or display updates to the file or media item often require storage that is immediately available.

Furthermore, devices and servers that store files and media items often must store the files and media items in multiple formats such that the file or media item may be accessed from any type of device, whether it be a smart phone, tablet, or desktop computer, such that the device receives a technically optimized file or media item as appropriate for that device's physical size, graphical user interface, capacity, bandwidth, connection, and/or operating system. Thus, the opportunity for instantaneous technical optimization of a file or media item is limited by the capacity of the server or device which stores the various file or media item formats.

Therefore, what is needed in the art are systems and methods for cost effective and efficient file or media item retrieval, generation, and delivery.

SUMMARY

Embodiments described herein generally relate to media file storage integration and the generation of device graphical user interface specific file formats based upon an original stored media item. One or more remote servers may provide a user one or more remote storage locations for media files and the remote servers may determine an exact storage location for a media file based on certain usage criteria. A server may make a request to retrieve a media file from storage, generate the media file from storage, and display the media file to the user on a device specific graphical user interface without the requirement that the displayed media file be re-stored or duplicated in storage.

In one embodiment, a method of generating and delivering access to media content is provided. The method may include requesting a media item from a storage location. The storage location may include a first storage location and a second storage location. The second storage location may have a latency interval less than a latency interval of the first storage location. The method may include requesting a media item in a first format from a storage location and generating a device graphical user interface specific media item in a second format. The method may further include requesting the media item in a first format from the first storage location and generating the media item in a second format. The method may also include delivering the media item in the second format to a user, transferring the media item in the first format from the first storage location to the second storage location, requesting the media item from the second storage location, and/or delivering the media item in the second format on a graphical user interface.

In another embodiment, a computer system for generating and determining access to media content is provided. The computer system for generating and determining access to media content may include a processor and a memory storing instructions that, when executed by the processor, may cause the computer system to request a media item from a storage location. The storage location may include a first storage location and a second storage location. The second storage location may have a latency interval less than a latency interval of the first storage location. The memory storing instructions that, when executed by the processor, may further cause the computer system to request the media item in a first format from the first storage location and generate the media item in a second format. The memory storing instructions that, when executed by the processor, may also cause the computer system to deliver the media item in the second format to a user, transfer the media item in the first format from the first storage location to the second storage location, request the media item from the second storage location, and/or deliver the media item in the second format on a graphical user interface.

In yet another embodiment, a non-transitory computer-readable storage medium, storing instructions that when executed by the processor, cause the processor to generate and determine access to media content is provided. The processor may perform the steps of requesting a media item from a storage location. The storage location may include a first storage location and a second storage location. The second storage location may have a latency interval less than a latency interval of the first storage location. The processor may further perform the steps of requesting the media item in a first format from the first storage location and generating the media item in a second format. The processor may also perform the steps of delivering the media item in the second format to a user, transferring the media item in the first format from the first storage location to the second storage location, requesting the media item from the second storage location, and/or delivering the media item in the second format on a graphical user interface.

BRIEF DESCRIPTION OF THE DRAWINGS

So that the manner in which the above features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the Figures. It is contemplated that elements disclosed in one embodiment may be beneficially utilized in other embodiments without specific recitation.

DETAILED DESCRIPTION

Embodiments described herein generally relate to file and media item storage and an application which determines, generates, and displays device graphical user interface specific file or media item sizes depending on the characteristics and abilities of the device. A server may store a file or media item such that it can be accessed upon request by a user. The server, however, may have differing levels of storage each of which may have varying latency periods between the time a user makes a request and the time the file or media items is retrieved and displayed on a graphical user interface. The server may make a determination of which level of storage to store a file or media item based upon certain characteristics of the file or media item. Furthermore, an original file or media item may be stored by the server; however, a determination may be made upon request of the file or media item of how to create, generate, and display a device graphical user interface specific display size of the file or media item to the user based upon the device from which the user made such a request.

The term "user" as used herein includes, for example, a person or entity that owns a computing device or a wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media" or "media item" as used herein includes, for example, messages, photos, videos, audio, blogs, advertisements, geotags, notifications, documents, word processing files, and various other types of media which may be consumed by a user. It is contemplated that the terms "media" and "media item" are not intended to be limiting and may include various examples beyond those described.

The term "radiometric characteristics" as used herein includes, for example, physical information, visual information, color, light intensity, and other distinctive aspects associated with a media item. It is contemplated that the term "radiometric characteristics" is not intended to be limiting and may include various examples beyond those described.

Figure 1:
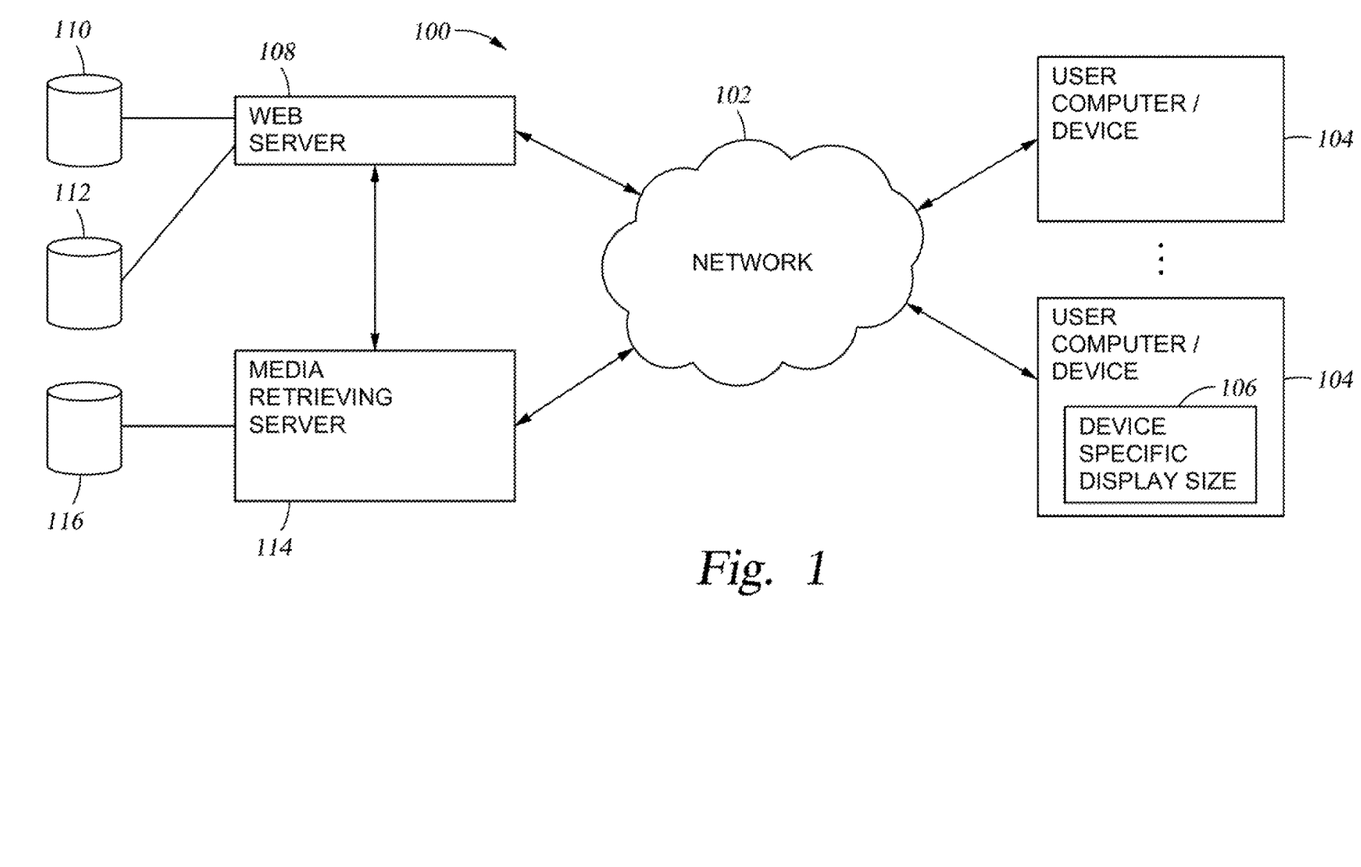
FIG. 1 illustrates a computer system configured for providing a media item storage server according to one embodiment described herein.

FIG. 1 illustrates a computer system 100 configured for providing a remote server storage location for a media file. As shown, the computing system 100 may include a web server 108, a media retrieving server 114, and a plurality of user computers (i.e., mobile/wireless devices, computers, tablets) 104, each connected to a communications network 102 (e.g., the internet). For example, the web server 108 may be programmed to communicate with the user computer 104 and the media retrieving server 114 using a networking protocol such as a TCP/IP protocol. The web server 108 may communicate directly with the user computer 104 through the communications network 102.

Each user computer 104 may include conventional components of a computing device, e.g., a processor, system memory, a hard disk drive, a battery, input devices such as a mouse and a keyboard, and/or output devices such as a monitor or graphical user interface (GUI), and/or a combination input/output device such as a touchscreen which not only receives input but also displays an output. The web server 108 may include a processor and a system memory (not shown), and may be configured to manage media content stored in a first storage location 110 and/or second storage location 112 using a file system and/or relational database software. The media retrieving server 114 may include a processor and a system memory (not shown), or may be a web server, and may be configured to manage media content stored in the media retrieving server's content storage unit 116. The media retrieving server 114 may be configured to receive input from a user, such as creating media associated with a digital camera or digital image recorder, or accessing media associated with a digital camera or digital image recorder.

In the embodiments described below, users are respectively operating the user computers 104 that may communicate over the network 102 to request media from the media retrieving server 114. Each user computer 104 may be configured to access media managed by the media retrieving server 114, controlled by the web server 108, and stored in the first storage location 110 or the second storage location 112. The media displayed to a user may be transmitted from the media retrieving server 114, via the web server 108, to the user's computer 104 for display through a GUI of the user's computer 104.

In one example, a media item is requested by a user from the web server 108, via the media retrieving server 114, which is accessed by the web server 108 from the first storage location 110. The first storage location 110 may have a latency interval greater than a latency interval of the second storage location 112. The media item may be requested in a first format and generated and delivered by the web server 108 to the user computer 104 in a second format via the media retrieving server 114. In one embodiment, the second format may be a device graphical user interface specific display size 106. The media item may be transferred in the first format from the first storage location 110 to the second storage location 112, and the second storage location 112 may have a latency interval less than a latency interval of the first storage location 110. Subsequently, the media item may be requested from the second storage location 112 and delivered to the user computer 104 in the second format on a graphical user interface in the device graphical user interface specific display size 106.

In another example, a media item may be stored in a first format in a first storage location. A second format of the media item may be stored in a second storage location. The second format may have a file size less than the file size of the first format. The second format of the media item may be requested by a user from the web server 108, via the media retrieving server 114, which is accessed by the web server 108 from the second storage location. The media item may be requested in a second format and generated and delivered by the web server 108 to the user computer 104 in a third format, a device graphical user interface specific display size 106, via the media retrieving server 114.

In another example, a media item is requested by a user from the web server 108, via the media retrieving server 114, which is accessed by the web server 108 from the second storage location 112. The second storage location 112 may have a latency interval less than the latency interval of the first storage location 110. The media item may be requested in a first format and generated and delivered by the web server 108 to the user computer 104 in a second format via the media retrieving server 114. In one embodiment, the second format may be the device graphical user interface specific display size 106. The media item may be transferred in the first format from the second storage location 112 to the first storage location 110, and the first storage location 110 may have a latency interval greater than a latency interval of the second storage location 112. Subsequently, the media item may be requested from the first storage location 110 and delivered to the user computer 104 in the second format on a graphical user interface in the device graphical user interface specific display size 106.

In another example, a media item may maintain a first format that is unprocessed data from an image sensor of a digital camera, an image scanner or a motion picture scanner. The unprocessed data may comprise radiometric characteristics of the media item, such as an image. The device graphical user interface specific display size 106 may have a file size less than a file size of the original format stored in either the first storage location 110 or the second storage location 112. The device graphical user interface specific display size 106 is selected from available information regarding the specific user computer's 104 GUI resolution, available transmission bandwidth, and/or type of operating system.

In another example, media displayed on a user computer 104 may be a media item associated with the device graphical user interface specific display size 106. The user computer 104 may access the media retrieving server 114 via the network 102. The network 102 is in operable communication with the web server 108. The web server 108 retrieves the media item from either the first storage location 110 or the second storage location 112. The web server 108 also causes the media item to be displayed on the user's computer 104 in a device graphical user interface specific display size 106.

It is noted that the user computer 104 may be a personal computer, laptop, mobile computing device, smart phone, video game console, home digital media player, network-connected television, set top box, and/or other computing devices having components suitable for communicating with the communications network 102. The user computer 104 may also execute other software configured to access and receive media items such as, but not limited to, media display software, media players, computer and video games, and/or widget platforms, among others.

Figure 2:
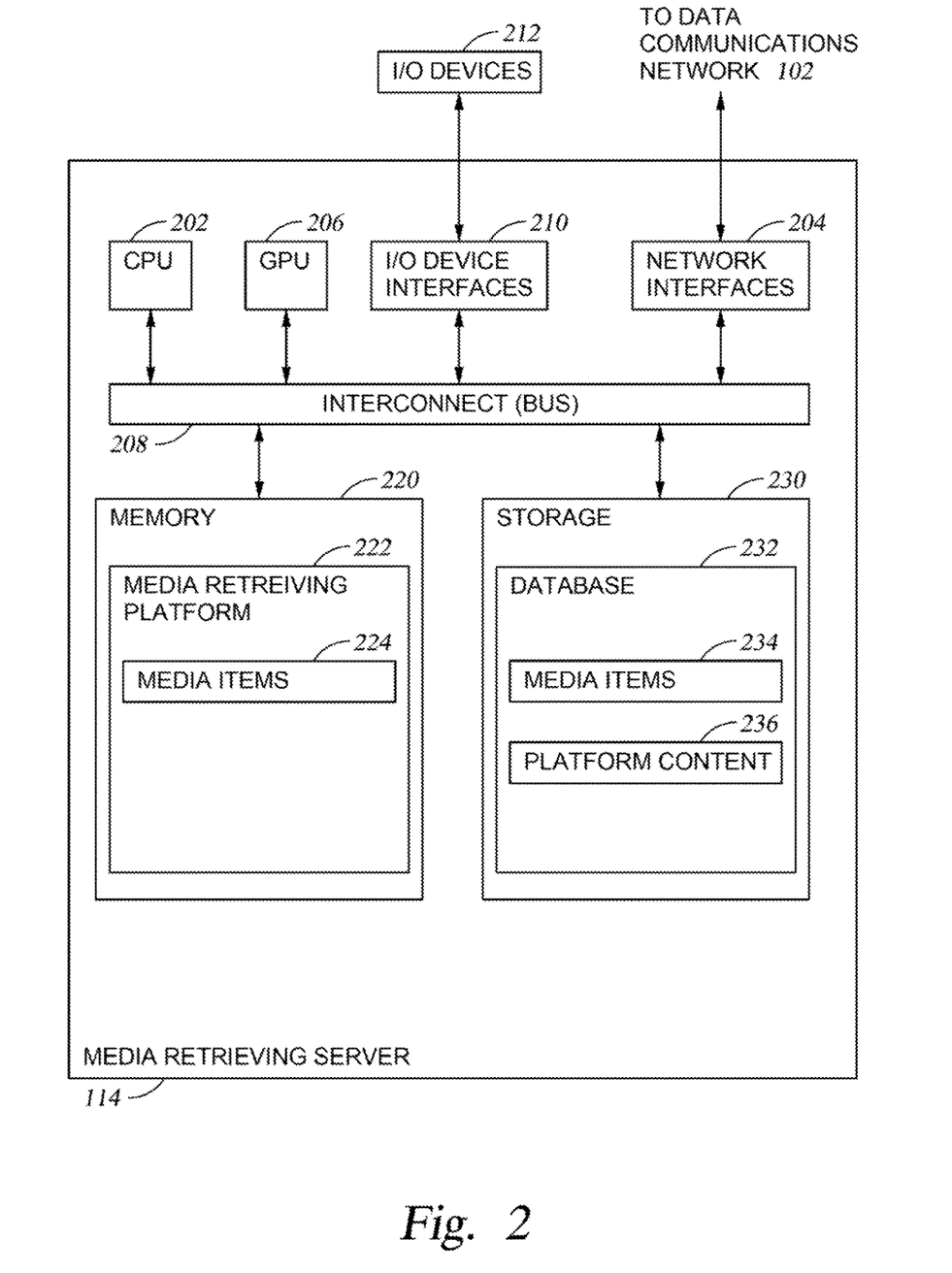
FIG. 2 illustrates a more detailed view of the server of FIG. 1 according to one embodiment described herein.

FIG. 2 illustrates a more detailed view of the media retrieval server 114 of FIG. 1. The media retrieval server 114 includes, without limitation, a central processing unit (CPU) 202, a network interface 204, a graphics processing unit 206, memory 220, and storage 230 communicating via an interconnect bus 208. The media retrieval server 114 may also include I/O device interfaces 210 connecting I/O devices 212 (e.g., keyboard, video, mouse, audio, touchscreen, etc.). The media retrieval server 114 may further include a network interface 204 configured to transmit data via the communications network 102.

The CPU 202 retrieves and executes programming instructions stored in the memory 220 and generally controls and coordinates operations of other system components. Similarly, the CPU 202 stores and retrieves data residing in the memory 220. The CPU 202 is included to be representative of a single CPU, multiple CPU's, a single CPU having multiple processing cores, and the like. The interconnect 208 is used to transmit programming instructions and data between the CPU 202, I/O device interfaces 210, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing a media retrieval platform 222. The media retrieval platform 222 may include media items 224, among other applications. The storage 230 may store media content and user generated media and may include a database 232 configured to store media items 234 associated with, but not limited to, photography, video, or word processing, and platform content 236. The database 232 may be any type of storage device.

Figure 3:
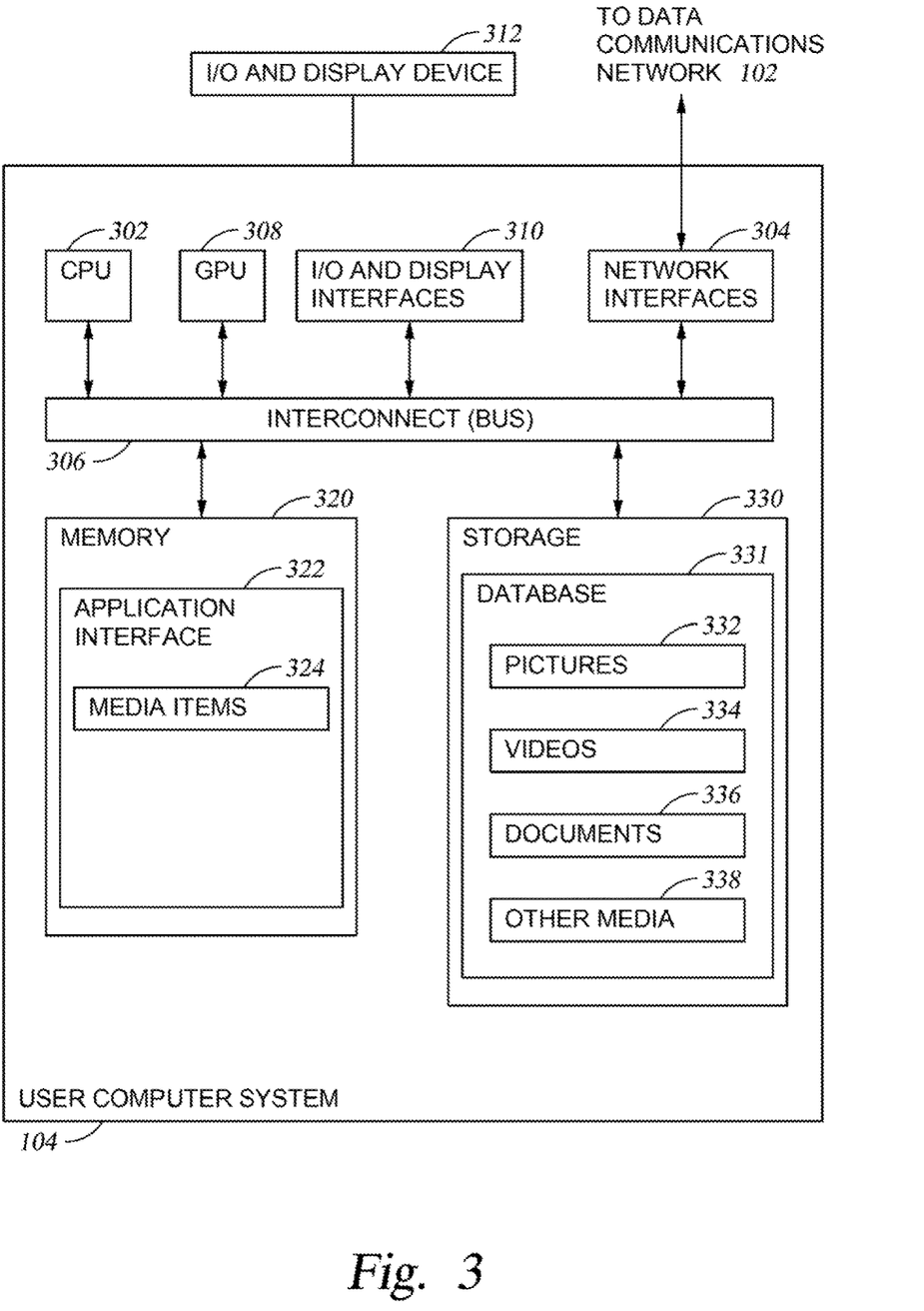
FIG. 3 illustrates a user computing system used to access a media item storage server and retrieve a media item according to one embodiment described herein.

FIG. 3 illustrates a user computing system 104 used to access the media retrieving server 114 and display media items associated with the media retrieval platform 222. The user computing system 104 may include, without limitation, a central processing unit (CPU) 302, a network interface 304, an interconnect 306, a graphics processing unit (GPU) 308, a memory 320, and storage 330. The computing system 104 may also include an I/O device interface 310 connecting I/O devices 312 (e.g., keyboard, display, touchscreen, and mouse devices) to the user computing system 104.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and data between the CPU 302, I/O device interfaces 310, storage 330, network interface 304, and memory 320. The network interface 304 may be configured to transmit data via the communications network 102, e.g. to stream content from the media retrieval server 114. Storage 330, such as a hard disk drive or solid-state storage drive (SSD), may store non-volatile data. The storage 330 may contain a database 331 for storing media items. The database 331 may contain pictures 332, videos 334, documents 336, and other media 338 which can be any type of media that may be uploaded to the media retrieving server 114. Illustratively, the memory 320 may include an application interface 322, which itself displays media items 324 via the user computer 104. The application interface 322 may provide one or more software applications which allow the user to access media items and other content hosted by the media retrieving server 114.

Figure 4:
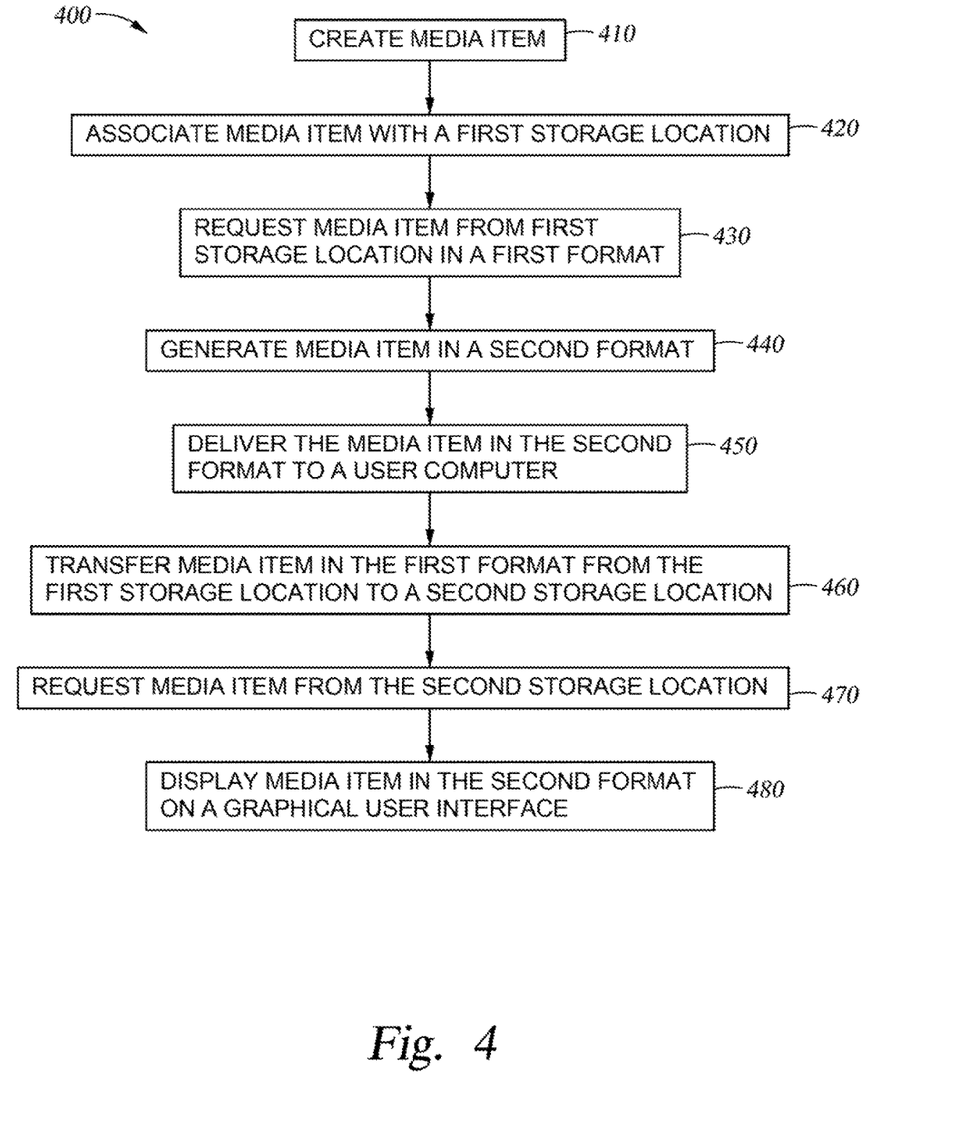
FIG. 4 schematically illustrates operations of a method to store, request, generate, deliver, and display a media item according to one embodiment described herein.

FIG. 4 schematically illustrates operations of a method 400 to store, request, generate, deliver, and display a media item according to one or more embodiments described herein. At operation 410, a media item is created. The media item may be created by a user. At operation 420, the media item is associated with a first storage location 110 for storing the media item. The first storage location 110 may have a latency interval greater than a latency interval of a second storage location 112.

At operation 430, the media item is requested from the first storage location 110 of the web server 108 in a first format. The first format may maintain unprocessed data from an image sensor of a digital camera, an image scanner, or a motion picture film scanner. The unprocessed data may contain radiometric characteristics of an image. The user may make the request via the user computer 104 which is in operable communication with the media retrieving server 114 via the network 102. The media retrieving server 114 subsequently requests the media item from the first storage location 110 of the web server 108 via the network 102.

At operation 440, the media item is generated in a second format via the media retrieving server 114. The second format may comprise a display size 106 which may have a file size less than the file size of the first format. The display size may be based upon, without limitation, one or more of a GUI resolution, available transmission bandwidth, and/or type of operating system.

At operation 450, the media item is delivered to the user in the second format from the media retrieving server 114 to the user computer 104 via the network 102. The media item is displayed to the user in the second format via an I/O device (e.g., a screen) 312 of the user computer 104 in a device graphical user interface specific display size 106 that is configured for the user computer 104 as described above.

Figure 5:
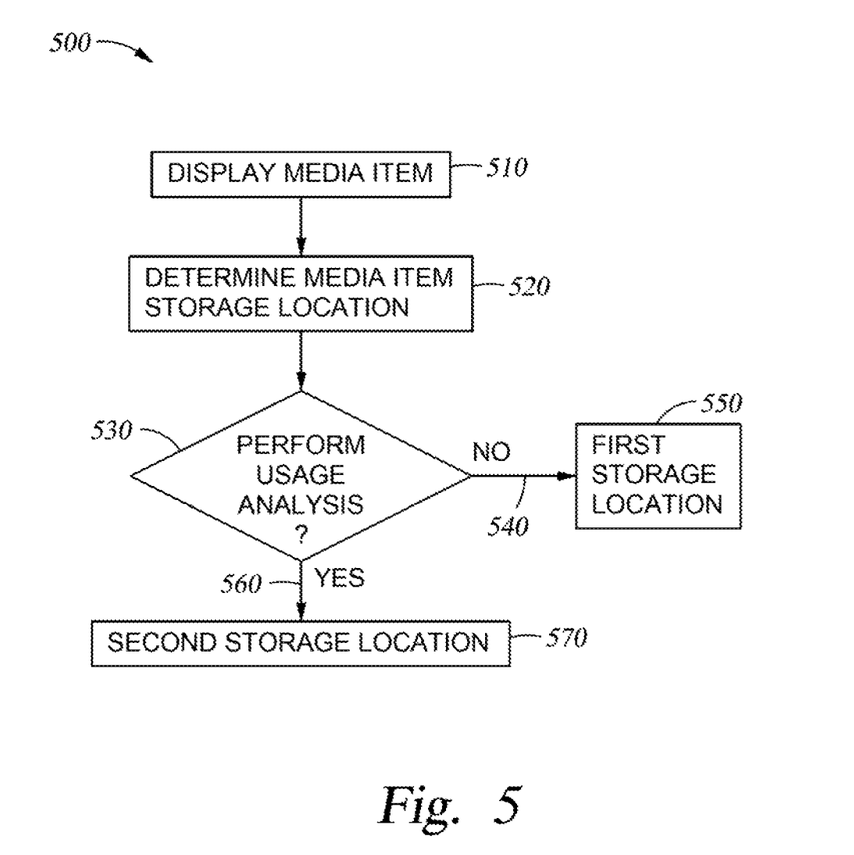
FIG. 5 schematically illustrates operations of a method for determining storage location and retrieval of a media item from a server to a system according to one embodiment described herein.

At operation 460, the media item is transferred in the first format from the first storage location 110 to the second storage location 112, if the requirements of a usage analysis are met as in operation 530. At operation 470, the media item is requested from the second storage location 112 of the web server 108 in the first format. The user may make the request via the user computer system 104 which is in operable communication with the media retrieving server 114 via the network 102. The media retrieving server 114 subsequently requests the media item from the second storage location 112 of the web server 108 via the network 102. At operation 480, the media item is displayed in the second format on a graphical user interface (not shown) of a user computer 104.

In one example, a user may take a photo with a digital camera, thus creating an original media item in a RAW image format, as in operation 410. The user may upload the original media item from a user computer system 104, via the network 102, to a media retrieving server 114. The media retrieving server 114 may associate the original media item with a first storage location 110 for storing the original media item, as in operation 420. The media retrieving server 114 may create a high resolution copy of the original media item wherein the high resolution copy of the media item may have a file size smaller than that of the original media item. The media retrieving server 114 may associate the high resolution copy of the media item with a second storage location 112. At a later point in time a user may, via a second user computer (not shown) such as a smart phone, request the media item from the second storage location 110 of the web server 108 in the high resolution copy media item format, as in operation 430, via the network 102. The first format is the format in which the media item was captured and stored in a first storage location 110; in this example a RAW image format maintaining unprocessed data from an image sensor of a digital camera. The second format is the format in which the media item was copied from the first format and stored in a second storage location 112. In order for the second user computer, in this example a smart phone, to display the media item such that it may be appropriately sized and displayed within the parameters of the smart phone's display screen, the media retrieving server 114 may instantly generate a third format of the media item from the second format of the media item, the third format being configured to display the media item within the dimensions of the smart phone's screen parameters as in operation 450 from the media item high resolution copy. The web server 108 may store the media item in the third format in the second storage location 112. As the third format is no longer needed, as determined by the media item usage analysis, the media item in the third format may be deleted from the second storage location 112.

In another example, a second user may, via a user computer such as a laptop computer having different display screen dimensions from the display screen used in the previous example, request the high resolution copy of the media item of the previous example from the second storage location 110 of the web server 108 in a second format, as in operation 430, via the network 102. In order for the second user's computer, in this example a laptop computer, to display the media item such that it may be appropriately sized and displayed within the parameters of the laptop's display screen, the media retrieving server 114 may instantly generate a file in a third format, specific to the display parameters of the user computer in this case, which can be configured to display within the dimensions of the laptop's screen parameters as in operation 450. It should be noted that the media item file instantly generated in this example in the third format, while appearing to occupy a percentage of the laptop computer display screen, will not be equivalent to the media item file instantly generated in the third format in the previous example due to the nonequivalent display screen sizes used in each example.

The high resolution copy of the media item may be stored in the second storage location 112 of the web server 108 such that they may be recalled if requested again by a user computer having identical device graphical user interface display size requirements.

In a third example, once a user has generated a media item, as in operation 410, and uploaded the media item from a user computer 104 to a media retrieving server 114, via the network 102, the media retrieving server 114 may associate the media item with a storage location as in operation 420. The media retrieving server 114 may perform a usage analysis as in operation 530 to determine an efficient storage location of the third format of the media item. The usage analysis may be based upon, but is not limited to, source of the media item, frequency with which the media item has been requested, amount of user provided descriptions of the media item, and/or amount of unique users of the media item. If the required criteria of the usage analysis are not met, the third format of the media item may be deleted or may be stored in a first storage location 110. If the required criteria of the usage analysis are met the media item may be stored in a second storage location 112.

The first storage location 110 may have a latency interval greater than a latency interval of the second storage location 112. For purposes of this example, the first storage location 110 has been determined as the most efficient storage location at this stage. As in operation 430, once a subsequent user request for the media item is made by a user computer 104 from the media retrieving server 114, the media retrieving server 114 may request the media item from the first storage location 110 as in operation 430. The media retrieving server 114 may generate the media item in a second format as in operation 440 and may deliver the media item in the second device graphical user interface specific format to the user computer as in operation 450. Subsequently, the media item may be displayed on a user computer display as in operation 510. The media retrieving server 114 may subsequently re-determine the media item storage location as in operation 520. In order to determine the most efficient media item storage location, the media retrieving server 114 may perform a usage analysis as in operation 530. The usage analysis may be based upon, but is not limited to, source of the media item, frequency with which the media item has been requested, amount of user provided descriptions of the media item, and/or amount of unique users of the media item. If the required criteria of the usage analysis are not met, the media item may be deleted or may be stored in a first storage location 110.

If the required criteria of the usage analysis are met, the media item may be stored in a second storage location 112. The first storage location 110 may have a latency interval greater than a latency interval of the second storage location 112. If the usage analysis of operation 530 yields a result different that the current media item storage location, the media item may be transferred from the first storage location 110 to the storage location 112 as in operation 460. With each subsequent request for the media item from storage, a usage analysis may be performed in order to determine the most efficient storage location of the media item.

In a fourth example, a third user may, via a user computer 104 such as a tablet computer having different display screen dimensions from the display screens used in the previous examples, request the media item from a storage location of a web server via a network in which the current invention does not exist. In this example, however, upon request for the media file by the user's tablet computer the media item may be displayed in the format as originally stored rather than a device graphical user interface specific display format. The format as originally stored may not be appropriately sized and displayed within the parameters of the tablet computer's display screen. The media item may not be configured to display within the dimensions of the tablet computer's screen parameters because the media item high resolution copy of the original RAW file image format may be displayed. An improperly configured image displayed on a user computer may cause the user to have to maneuver the screen display dimensions in order to properly view the entire image. It is contemplated that improper configuration and display may be prevented by utilizing the embodiments described herein. Subsequently, each time a user requests the media item from storage the user computer 104 may display the original media item in its full media item file size.

FIG. 5 schematically illustrates operations of a method 500 for determining storage location and retrieval of a media item from a server to a system according to one embodiment described herein. The method generally relates to embodiments where a storage location is determined based on a usage analysis of the media item. At operation 510, a media item is displayed to a user via a graphical user interface (not shown) of a user computer 104. At operation 520, a media item storage location is determined via the media retrieving server 114.

At operation 530, the media item's usage analysis is performed by the media retrieving server 114 to determine an efficient storage location for the first format of the media item. If the determination made in operation 530 indicates at operation 540 the media item's usage analysis is not within a satisfactory range, the media item may be stored in the first storage location 110 at operation 550. However, if the determination made in operation 530 indicates at operation 560 the media item's usage analysis is within a satisfactory range, the media item may be stored in the second storage location 112 at operation 570.

The media item's usage analysis is dependent upon a plurality of factors including, but not limited to, source of the media item, frequency with which the media item is or has been requested, amount of user provided descriptions of the media item, and/or amount of unique users of the media item. The first storage location 110 may have a latency interval greater than a latency interval of the second storage location 112.

The media item usage analysis may provide for more cost effective storage and media item delivery. Without performing the media item usage analysis, the media item may remain in the second storage location 112 due to the second storage location 112 having a latency interval less than a latency interval of the first storage location 110. A storage location with a lower latency interval may be less cost effective than a storage location with a higher latency interval. The ability to transfer storage locations based upon a usage analysis of a media item may allow a media item to be stored in the most cost effective storage location. A storage location with a high latency interval may take more time to retrieve, produce, and/or display the media item as compared to a storage location with a low latency interval. Producing a device specific display size of a media item without having to re-store the device specific display size media item allows for instant media item delivery coupled with an increased efficiency of storage costs.

Figure 6:
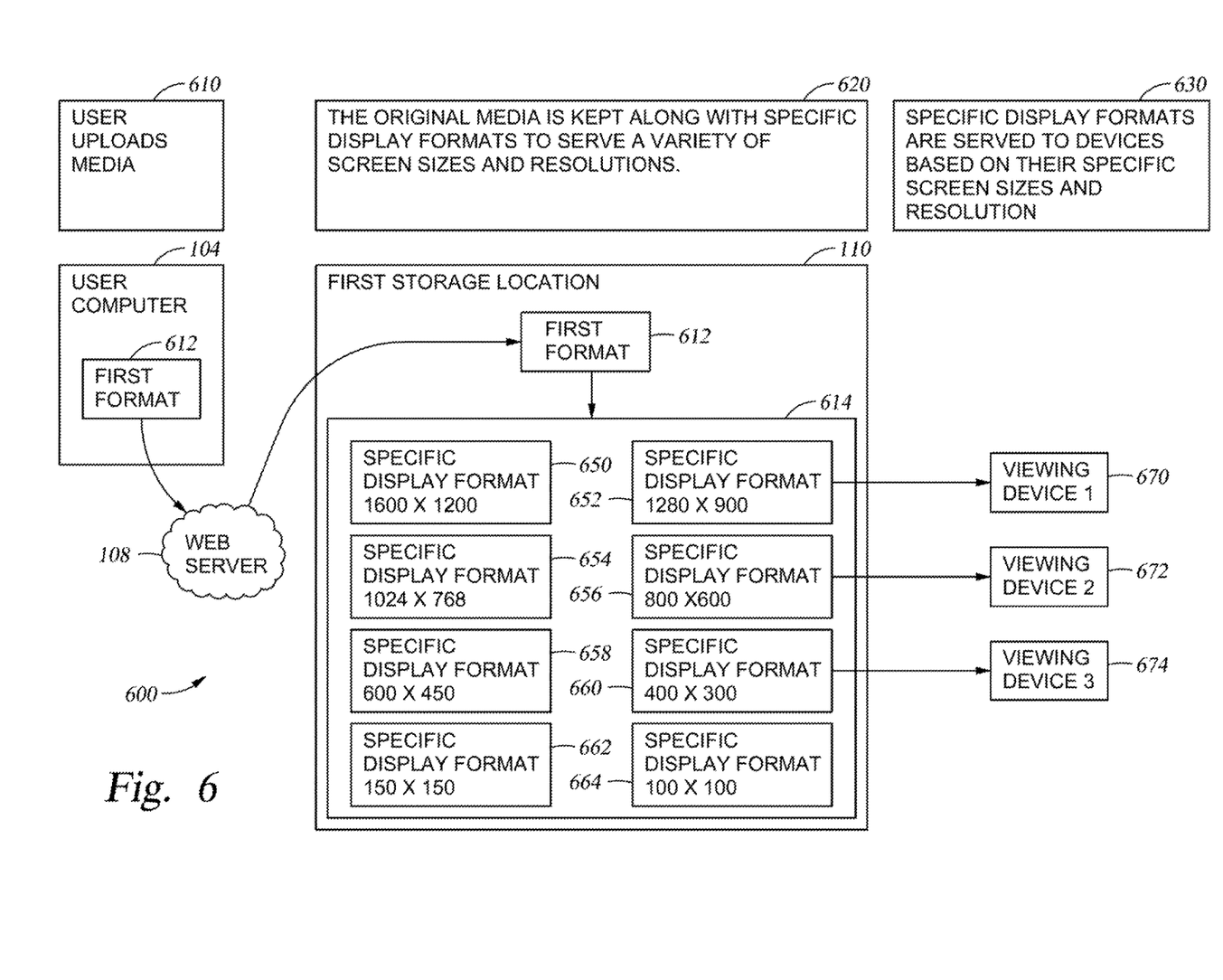
FIG. 6 illustrates a computer system configured for providing a media item storage server as it exists in the art.

FIG. 6 illustrates a computer system 600 configured for providing a media item storage server. As illustrated, at operation 610 a user may upload a media item in a first format 612 via a user computer 104 to web server 108 via a communications network 102. The first format 612 may be an original image, such as a RAW file. As in operation 620, the media item in the first format 612 may be stored in a first storage location 110. The first storage location 110 may be continuously and immediately available storage, and store the first format 612 of the media item such that it is readily available when requested by a user. The first storage location 110 may also store various second formats 614 of the media item, each second specific display format 650, 652, 654, 656, 658, 660, 662, 664 being formatted to serve a variety of user GUI display sizes and resolutions.

Upon receiving a user request at operation 630, the media retrieving server 114 may generate and display the media item in the second format 614, selected to serve the specific user GUI display and resolution 670, 672, 674. As described in this example, the second format 614 may be a device graphical user interface specific display format suitable for the size and specifications of a unique device graphical user interface selected from one of the second specific display format 650, 652, 654, 656, 658, 660, 662, or 664. Upon generating the media item in the second format 614, the media retrieving server 114 may store each device graphical user interface second specific display format 650, 652, 654, 656, 658, 660, 662, 664. The media item in the second format 614 may be stored along with the media item in the first format 612 in the first storage location 110 until either the first format 612 or the second format 614 is requested again by a user. Both the first format 612 and the second format 614 of the media item are stored in the first storage location 110 which, for this example only, is immediately available storage.

Figure 7:
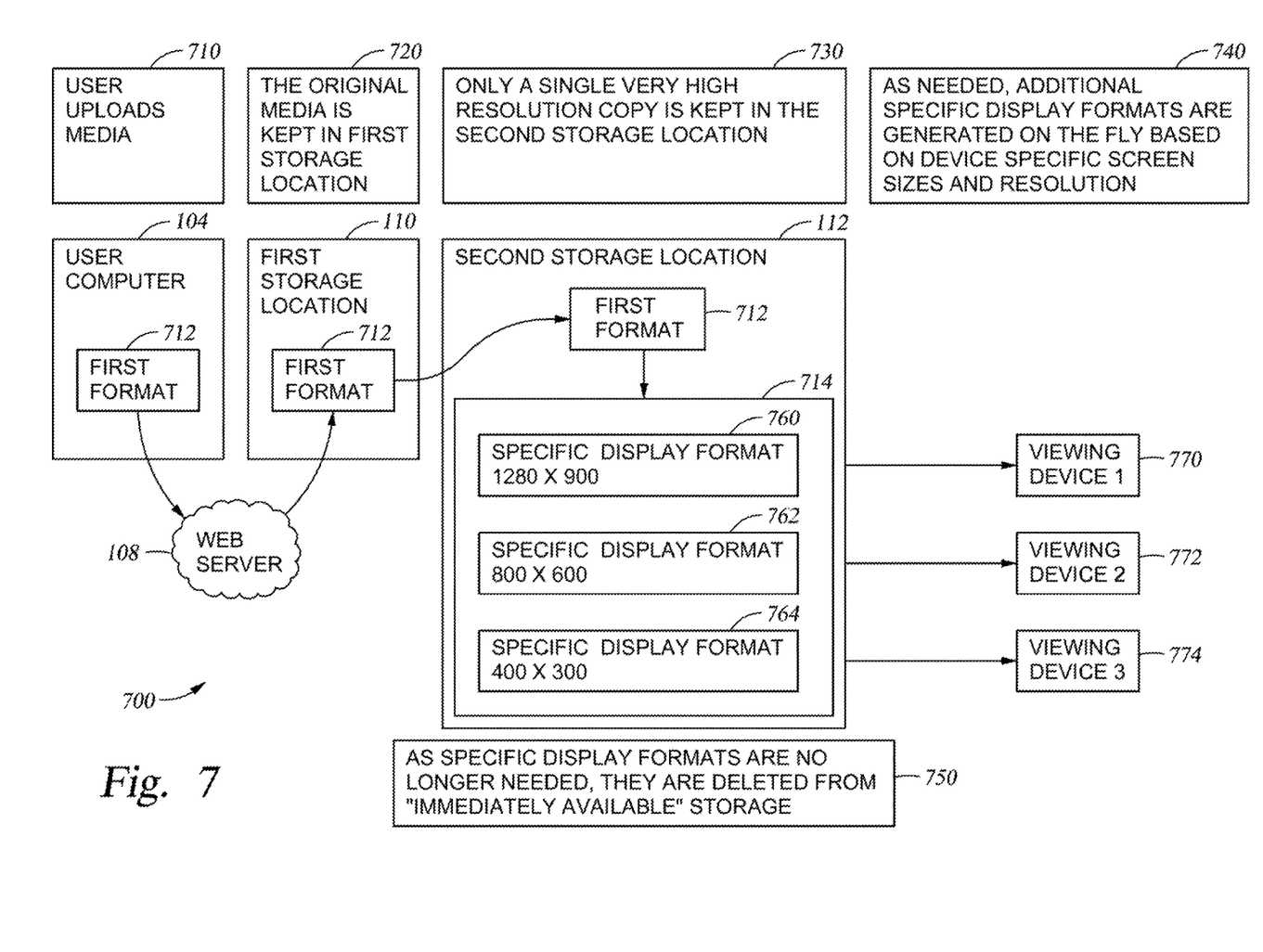
FIG. 7 illustrates a computer system configured for providing a media item storage server according to one embodiment described herein.

FIG. 7 illustrates a computer system 700 configured for providing a media item storage server according to one embodiment. As illustrated in operation 710, a user may upload a media item in a first format 712 via a user computer 104 to a web server 108 via a communications network 102. The first format 712 may be an original image, such as a RAW file. At operation 720, the media item in the first format 712 may be stored in a first storage location 110. At operation 730, a copy of the media item may be created in a second format 714, and the second format 714 may have a file size less than a file size of the first format 712. The second format 714 may be a high resolution copy of an original image.

The media item in the first format 712 may be stored in a first storage location 110 and the media item in the second format may be stored in a second storage location 112. The first storage location 110 may have a latency interval greater than a latency interval of the second storage location 112. The first storage location 110 may be non-immediately available storage. The second storage location 112 may be immediately available storage. At operation 740, upon receiving a request from a user computer 104, a media item in a third format 760, 762, 764 may be generated and displayed on a graphical user interface in the third format 760, 762, 764 that is specific to the device's graphical user interface 770, 772, 774 based, in part, on the device's specific graphical user interface and resolution. The media item in the third format 760, 762, 764 may be stored in the second storage location 112 until requested again. At operation 750, as the media item in the third format 760, 762, 764 is no longer needed, as determined by the media item usage analysis previously discussed, the media item in the third format 760, 762, 764 may be deleted from the second storage location 112.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure. Therefore, the scope of the embodiments provided herein is determined by the claims that follow.

What is claimed is:

1. A method of generating and delivering access to media content, comprising:
   receiving a request for a media item from a storage location, the storage location comprising:
      a first storage location comprising non-immediately available storage and a second storage location comprising immediately available storage, wherein the second storage location has a latency interval less than a latency interval of the first storage location, the request specifying the media item in a first format from the first storage location, the first format comprising unprocessed data from an image sensor;
   generating the media item in a second format from the media item in the first format, the media item in the second format having a file size smaller than a file size of the media item in the first format, the media item in the second format stored in the second storage location;
   generating the media item in a display format from the second format, the display format corresponding to a graphical user interface, the media item in the display format having a file size smaller than the file size of the media item in the second format;
   storing the media item in the display format in the second storage location;
   delivering the media item in the display format to the graphical user interface; and
   performing a usage analysis of the media item to determine whether to delete the media item in the display format from the second storage location or transfer the media item in the display format to the first storage location, wherein the usage analysis is dependent upon one or more of a source of the media item, a frequency with which the media item has been requested, an amount of user provided descriptions of the media item, or an amount of unique users of the media item.

2. The method of claim 1, further comprising:
   receiving a second request for the media item from the second storage location; and
   performing the usage analysis on the media item, wherein the usage analysis is performed for each subsequent request of the media item from the second storage location.

3. The method of claim 1, wherein the file size of the media item in each of the first format, the second format, and the display format are different.

4. The method of claim 1, wherein the unprocessed data comprises radiometric characteristics of an image.

5. The method of claim 1, wherein the display format comprises a display size.

6. The method of claim 5, wherein the display format is selected based upon one or more of a graphical user interface resolution, available transmission bandwidth, and type of operating system.

7. The method of claim 1, wherein a length of time the media item in the display format remains in the second storage location is dependent upon a plurality of factors comprising:
   the source of the media item;
   the frequency with which the media item has been requested;
   the amount of user provided descriptions of the media item; and
   the amount of unique users of the media item.

8. A computer system for generating and determining access to media content, comprising:
a processor; and
a memory storing instructions that, when executed by the processor, cause the computer system to:
receive a request for a media item from a storage location, the storage location comprising:
a first storage location comprising non-immediately available storage and a second storage location comprising immediately available storage, wherein the second storage location has a latency interval less than a latency interval of the first storage location, the request specifying the media item in a first format from the first storage location, the first format comprising unprocessed data from an image sensor;
generate the media item in a second format from the media item in the first format the media item in the second format having a file size smaller than a file size of the media item in the first format, the media item in the second format stored in the second storage location;
generate the media item in a display format from the second format, the display format corresponding to a graphical user interface, the media item in the display format having a file size smaller than the file size of the media item in the second format;
store the media item in the display format in the second storage location;
deliver the media item in the display format to the graphical user interface; and
perform a usage analysis of the media item to determine whether to delete the media item in the display format from the second storage location or transfer the media item in the display format to the first storage location, wherein the usage analysis is dependent upon one or more of a source of the media item, a frequency with which the media item has been requested, an amount of user provided descriptions of the media item, or an amount of unique users of the media item.

9. The computer system of claim 8, the memory further comprising instructions that when executed by the processor, cause the computer system to:
receive a second request for the media item from the second storage location; and
perform the usage analysis on the media item, wherein the usage analysis is performed for each subsequent request of the media item from the second storage location.

10. The computer system of claim 8, wherein the file size of the media item in each of the first format, the second format, and the display format are different.

11. The computer system of claim 8, wherein the unprocessed data comprises radiometric characteristics of an image.

12. The computer system of claim 8, wherein the display format comprises a display size.

13. The computer system of claim 12, wherein the display format is selected based upon one or more of a graphical user interface resolution, available transmission bandwidth, and type of operating system.

14. The computer system of claim 8, wherein a length of time the media item in the display format remains in the second storage location is dependent upon a plurality of factors comprising:
the source of the media item;
the frequency with which the media item has been requested;
the amount of user provided descriptions of the media item; and
the amount of unique users of the media item.

15. A non-transitory computer-readable storage medium, storing instructions that when executed by a processor, cause the processor to generate and determine access to media content, by performing the steps of:
receiving a request for a media item from a storage location, the storage location comprising:
a first storage location comprising non-immediately available storage and a second storage location comprising immediately available storage, wherein the second storage location has a latency interval less than a latency interval of the first storage location, the request specifying the media item in a first format from the first storage location, the first format comprising unprocessed data from an image sensor;
generating the media item in a second format from the media item in the first format, the media item in the second format having a file size smaller than a file size of the media item in the first format, the media item in the second format stored in the second storage location;
generating the media item in a display format from the second format, the display format corresponding to a graphical user interface, the media item in the display format having a file size smaller than the file size of the media item in the second format;
storing the media item in the display format in the second storage location;
delivering the media item in the display format to the graphical user interface; and
performing a usage analysis of the media item to determine whether to delete the media item in the display format from the second storage location or transfer the media item in the display format to the first storage location, wherein the usage analysis is dependent upon one or more of a source of the media item, a frequency with which the media item has been requested, an amount of user provided descriptions of the media item, or an amount of unique users of the media item.

16. The non-transitory computer-readable storage medium of claim 15, further comprising instructions that when executed by the processor, cause the processor to perform the steps of:
receiving a second request for the media item from the second storage location; and
performing the usage analysis on the media item, wherein the usage analysis is performed for each subsequent request of the media item from the second storage location.

17. The non-transitory computer-readable storage medium of claim 15, wherein the file size of the media item in each of the first format, the second format, and the display format are different.

18. The non-transitory computer-readable storage medium of claim 15, wherein the unprocessed data comprises radiometric characteristics of an image.

19. The non-transitory computer-readable storage medium of claim 15, wherein the display format comprises a display size.

20. The non-transitory computer-readable storage medium of claim 19, wherein the display format is selected based upon one or more of a graphical user interface resolution, available transmission bandwidth, and type of operating system.

21. The non-transitory computer-readable storage medium of claim 15, wherein a length of time the media item in the display format remains in the second storage location is dependent upon a plurality of factors comprising:
    the source of the media item;
    the frequency with which the media item has been requested;
    the amount of user provided descriptions of the media item; and
    the amount of unique users of the media item.

* * * * *